(12) United States Patent
Gangloff, Jr. et al.

(10) Patent No.: US 12,024,458 B2
(45) Date of Patent: Jul. 2, 2024

(54) GLASS-CERAMIC MATRIX COMPOSITE FEEDSTOCK AND FORMING

(71) Applicant: Hamilton Sundstrand Corporation, Charlotte, NC (US)

(72) Inventors: John J. Gangloff, Jr., Middletown, CT (US); Paul Sheedy, Bolton, CT (US); Justin B. Alms, Coventry, CT (US); John E. Holowczak, South Windsor, CT (US); Daniel A. Mosher, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 904 days.

(21) Appl. No.: 17/012,351

(22) Filed: Sep. 4, 2020

(65) Prior Publication Data

US 2022/0073399 A1   Mar. 10, 2022

(51) Int. Cl.
*C03B 23/03* (2006.01)
*C03B 19/09* (2006.01)

(52) U.S. Cl.
CPC .......... *C03B 23/0302* (2013.01); *C03B 19/09* (2013.01); *C03B 2215/40* (2013.01)

(58) Field of Classification Search
CPC ....... C03B 11/005; C03B 19/06; C03B 19/09; C03B 2215/40; C03B 23/0302
See application file for complete search history.

(56) References Cited

U.S. PATENT DOCUMENTS

| | | | | |
|---|---|---|---|---|
| 4,822,660 A | * | 4/1989 | Lipp | ...................... C03B 19/06 428/113 |
| 4,857,093 A | * | 8/1989 | Prewo | ................... C03C 14/002 216/36 |
| 5,474,635 A | | 12/1995 | Jacob et al. | |

(Continued)

FOREIGN PATENT DOCUMENTS

| | | |
|---|---|---|
| CN | 105172145 A | 12/2015 |
| CN | 109454870 A | 3/2019 |

(Continued)

OTHER PUBLICATIONS

Department of Energy—"Low Cost Glass Ceramic-Matrix Composites for Harsh Environment Heat Exchangers" DOE/EE-1847 Dated Dec. 2018 (Year: 2018).*

(Continued)

*Primary Examiner* — Alex B Efta
*Assistant Examiner* — Alexander S Wright
(74) *Attorney, Agent, or Firm* — Kinney & Lange, P.A.

(57) ABSTRACT

A method of forming a part includes forming a glass-ceramic matrix composite material to form a pre-consolidated feedstock sheet with a pre-determined shape. The pre-consolidated feedstock sheet is sectioned into a first piece of pre-consolidated feedstock sheet and a second piece of pre-consolidated feedstock sheet. The first piece of pre-consolidated feedstock sheet and a second piece of pre-consolidated feedstock sheet are assembled with a second piece of pre-consolidated feedstock sheet to form a composite layup. The first piece of pre-consolidated feedstock (Continued)

sheet and the second piece of pre-consolidated feedstock sheet are joined by compressing the composite layup to form a glass-ceramic matrix composite part.

16 Claims, 3 Drawing Sheets

(56) References Cited

U.S. PATENT DOCUMENTS

| | | | |
|---|---|---|---|
| 5,589,115 A | * | 12/1996 | Sherwood ............... C04B 35/80 |
| | | | 156/89.26 |
| 10,105,758 B2 | | 10/2018 | Aydin et al. |
| 2018/0200964 A1 | | 7/2018 | Rockstroh et al. |

FOREIGN PATENT DOCUMENTS

| | | | |
|---|---|---|---|
| JP | 2014008735 A | * | 1/2014 |
| KR | 2015133328 A | | 11/2015 |

OTHER PUBLICATIONS

Karl M. Prewo, "The Development of Fiber Reinforced Glasses and Glass Ceramics", 1986. Plenum Press. Pertinent Page is 530 as marked on the page, or the second page of PDF. (Year: 1986).*
Extended European Search Report for EP Application No. 21182743.1, dated Jan. 10, 2022, 8 pages.

* cited by examiner

GLASS-CERAMIC MATRIX COMPOSITE FEEDSTOCK AND FORMING

STATEMENT OF GOVERNMENT INTEREST

This invention was made with government support under Contract No. DE-EE0008318 awarded by United States Department of Energy. The government has certain rights in the invention.

BACKGROUND

This disclosure relates generally to glass-ceramic matrix composites ("GCMCs") and more particularly to the processing and formation of a GCMC part.

In formation of GCMC's, one of the technical challenges is to rapidly and fully consolidate high temperature molten glass into ceramic fibers to form GCMC parts. Additionally, complex geometries of the GCMC part can create areas with defects due to the challenge of maintaining fiber orientations and matrix density during fiber preform layup into dies or molds.

SUMMARY

A method of forming a part includes forming a glass-ceramic matrix composite material to form a pre-consolidated feedstock sheet with a pre-determined shape. The pre-consolidated feedstock sheet is sectioned into a first piece of pre-consolidated feedstock sheet and a second piece of pre-consolidated feedstock sheet. The first piece of pre-consolidated feedstock sheet and a second piece of pre-consolidated feedstock sheet are assembled with a second piece of pre-consolidated feedstock sheet to form a composite layup. The first piece of pre-consolidated feedstock sheet and the second piece of pre-consolidated feedstock sheet are joined by compressing the composite layup to form a glass-ceramic matrix composite part.

A method of forming a glass-ceramic matrix composite part includes forming a consolidated feedstock material and forming a consolidated glass-ceramic matrix composite complex part. Forming a consolidated feedstock material includes sourcing a ceramic fiber and a glass matrix material that are unconsolidated. The unconsolidated ceramic fiber and glass matrix materials are loaded into a first tooling. Heat and pressure are applied to the unconsolidated ceramic fiber and glass matrix materials to form a consolidated feedstock material. Forming the consolidated glass-ceramic matrix composite complex part includes sectioning the consolidated feedstock material to produce a plurality of consolidated feedstock material pieces. The plurality of consolidated feedstock material pieces is assembled into a composite layup. Heat and pressure are then applied to the composite layup to fuse the consolidated feedstock material pieces and form the consolidated glass-ceramic matrix composite complex part.

The present summary is provided only by way of example, and not limitation. Other aspects of the present disclosure will be appreciated in view of the entirety of the present disclosure, including the entire text, claims, and accompanying figures.

While the above-identified figures set forth one or more embodiments of the present disclosure, other embodiments are also contemplated, as noted in the discussion. In all cases, this disclosure presents by way of representation and not limitation. It should be understood that numerous other modifications and embodiments can be devised by those skilled in the art, which fall within the scope and spirit of the principles of the disclosure. The figures may not be drawn to scale, and applications and embodiments of the present disclosure may include features and components not specifically shown in the drawings.

DETAILED DESCRIPTION

This disclosure presents a process of forming a GCMC workpiece by pre-consolidating GCMC material(s) in a first compression molding step to produce shaped feedstock parts, then combining one or more feedstock parts into an assembly. This assembly of parts is joined together with secondary compression molding operations to form a final GCMC part with complex geometries. In some embodiments, other methods of forming such as glass transfer molding can alternatively or additionally be used.

An example application of this disclosure is the fabrication of feedstock tube sheets with embedded channels and feedstock blocks for headers that are joined together to form headered tube sheets for high temperature heat exchangers. The disclosure can be used to fabricate corrugated tube sheet feedstock that is then sectioned and formed into heat exchanger tube sheet elements. To do this, one can pre-consolidate GCMC layers, then one can pre-consolidate that position and join the tubes together in a tube sheet.

Figure 1:
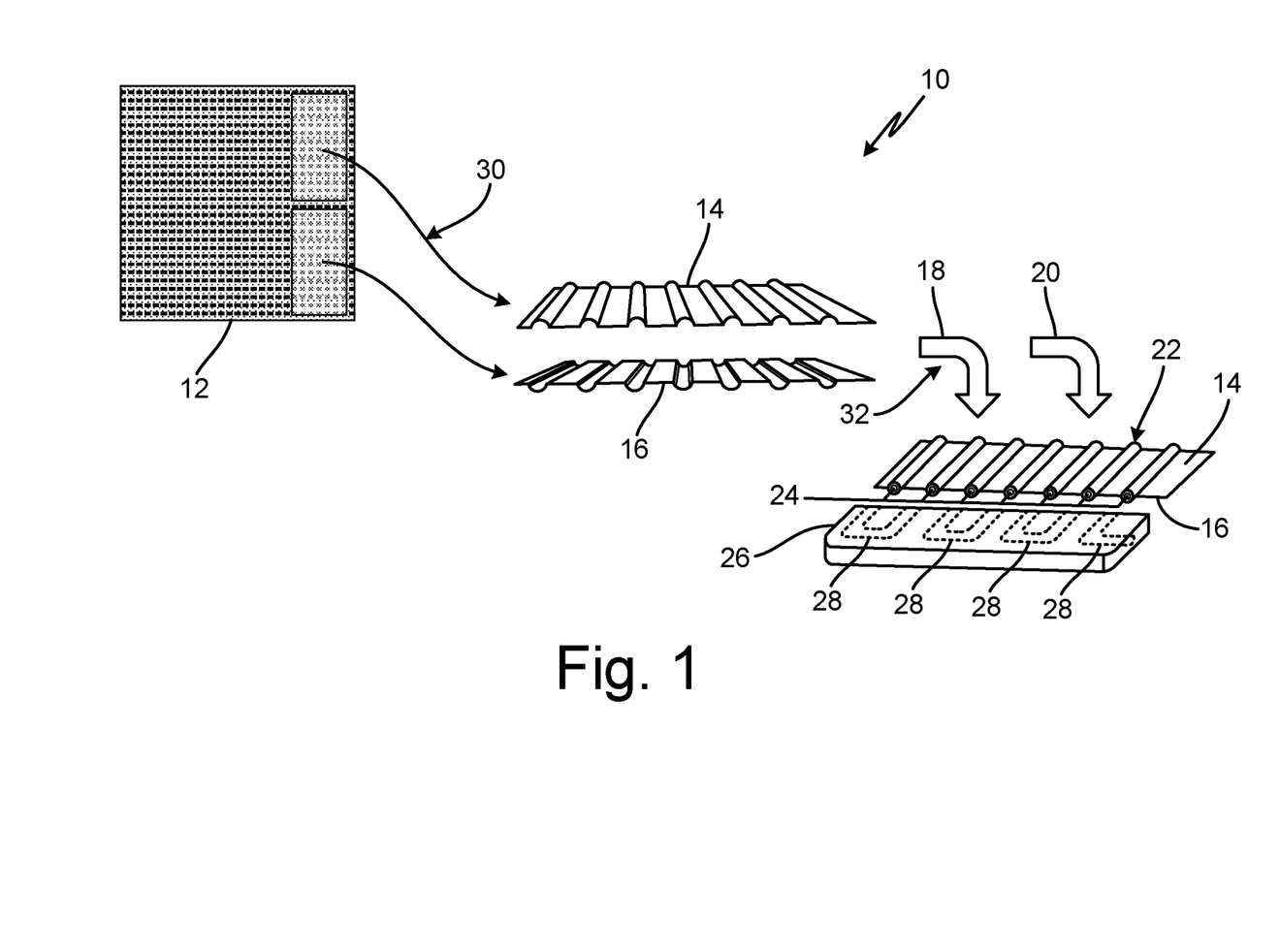
FIG. 1 is a process illustration of a method of forming and joining glass-ceramic matrix composite feedstock.

FIG. 1 is an illustrated view of process flow 10 depicting large feedstock sheet 12, first feedstock piece 14, second feedstock piece 16, heat 18, compression 20, consolidated feedstock sheet 22 (with passages 24), header 26 (with channels 28), step 30, and step 32.

Large feedstock sheet 12 is a single, large-scale feedstock sheet that is pre-fabricated via high temperature hot pressing. In another example, large feedstock sheet 12 can be formed via glass transfer molding or other forming processes. In this example, large feedstock sheet 12 includes glass-ceramic matrix composite material and a complex undulated geometry that can be made with standardized process equipment. In one example, large feedstock sheet 12 can include continuous or discontinuous fibers and/or reinforcements. First feedstock piece 14 and second feedstock piece 16 are two separate portions of large feedstock sheet 12. Heat 18 is an arrow representative of the application of thermal energy. Compression 20 is an arrow representative of the application of compression.

Consolidated feedstock sheet 22 is a single composite feedstock sheet that includes first feedstock piece 14 and second feedstock piece 16 formed together. In one example, consolidated feedstock sheet 22 can represent a headered tube sheet for use in a heat exchanger. In another example, consolidated feedstock sheet 22 can represent a pre-consolidated feedstock sheet that is combined with additional materials and utilized in additional process steps to form a headered tube sheet. Passages 24 and channels 28 are passages or fluidic channels configured for the communication and transport of a fluid such as liquid or gas. In this example, header 26 is a header block of a heat exchanger or a heat exchanger assembly.

Step 30 is a step in the process that includes sectioning or cutting pieces from large feedstock sheet 12 to produce first feedstock piece 14 and second feedstock piece 16. In another example, in place of or in addition to sectioning, step 30 can also include machining large feedstock sheet 12 into complex shapes or other varied geometrical shapes. Step 32 is another step in the process that includes applying heat 18 and compression 20 to first feedstock piece 14 and second feedstock piece 16 to form consolidated feedstock sheet 26.

First feedstock piece 14 and second feedstock piece 16 are individual pieces sectioned or cut from large feedstock sheet 12 as shown by step 30. In step 32, first feedstock piece 14 and second feedstock piece 16 become permanently joined to form consolidated feedstock sheet 22 with passages 24 formed between and by the joining of first feedstock piece 14 and second feedstock piece 16. During step 32, heat 18 and compression 20 are applied to first feedstock piece 14 and second feedstock piece 16 in order to fuse first feedstock piece 14 and second feedstock piece 16 together to form consolidated feedstock sheet 22. In this example, consolidated feedstock sheet 22 can be connected physically and in fluid communication with header 26.

Passages 24 extend through a plane of consolidated feedstock sheet 22. In this example, passages 24 are parallel to each other. Upon assembly of header 26 to consolidated feedstock sheet 22, passages 24 are in fluid communication with channels 28 of header 26. Here, header 26 is shown as disconnected from consolidated feedstock sheet 22 for clarity. In an assembled state, header 26 becomes attached to and mounted onto consolidated feedstock sheet 22. In another example, a second header with corresponding channels can be positioned on the far or opposite side of consolidate feedstock sheet 22 (such a second header block has been omitted from FIG. 1 for clarity). In an assembled state, channels 28 are in fluid communication with passages 24 of consolidated feedstock sheet 22. Here, channels 28 are shown with a U-shape configuration to direct fluid flow from one of passages 24 to another one of passages 24. In another embodiment, channels 28 can include a straight shape so as to pass the fluid from one of passage 24, through header 26, and into another component connected to header 26.

In one example, a method of forming a part includes fabricating a pre-consolidated feedstock sheet (e.g., large feedstock sheet 12). Fabricating large feedstock sheet 12 includes compression molding a glass-ceramic matrix composite material to include a pre-determined shape or shapes, which in this example can include bumps or corrugations. In other examples, the pre-determine shape can include other complex geometries such as curves. Fabricating large feedstock sheet 12 can also include compression molding the glass-ceramic matrix composite material to form large feedstock sheet 12 with a pre-determined shape that includes embedded channels. In this example, compression molding the glass-ceramic matrix composite material includes hot pressing the glass-ceramic matrix composite material. Here, the glass-ceramic matrix composite material can include ceramic fibers and/or glass matrix materials.

Large feedstock sheet 12 is sectioned into a plurality of pieces of pre-consolidated feedstock sheet (e.g., first feedstock piece 14 and second feedstock piece 16). First feedstock piece 14 and second feedstock piece 16 are assembled with other materials such as one or more layers of tape (e.g., a non-woven material) and one or more mandrels to form a composite layup. In one example, the one or more layers of tape and one or more mandrels can include unidirectional fibers and glass powders in a 'green' or unconsolidated layup. In another example, a fabric (e.g., a woven material) can be used in place of an/or in combination with the one or more layers of tape. In another example, the composite layup can include an assembly of various differently machined pieces of large feedstock sheet 12. In such an example, the composite layup can include a pyramid shaped sack with various sized machined flat pieces of feedstock to form a more complex shape, with some of the feedstock pieces having holes or other features machined in the feedstock pieces. The composite layup is joined or consolidated by pressing the composite layup together to form a glass matrix composite part such as consolidated feedstock sheet 22. During the step of assembling and joining, an orientation of the fibers (e.g., parallel or orthogonal) is maintained.

Additionally, header 26 is formed by draping ceramic fiber fabric over a plurality of ceramic wound tubes, which is achieved by consolidating header 26 (via compression molding) with the glass matrix composite part. Header 26 is then joined to and in fluid communication with the glass matrix composite part to form a headered tube sheet heat exchanger. The tube sheet heat exchanger can then be ceramed to create the final GCMC part. In such a step, the ceraming is a crystallization step to order the previously amorphous structure of the glass matrix.

Here, large feedstock sheet 12 is pre-fabricated via high temperature and vacuum hot pressing. Large feedstock sheet 12 features complex undulated geometry (e.g., corrugations or embedded channels) that can be made with standardized process equipment and stored after processing. Next, large feedstock sheet 12 is sectioned into multiple feedstock pieces. In the illustrated embodiment, for example, large feedstock sheet 12 is sectioned into first feedstock piece 14 and second feedstock piece 16 with various shapes and sizes as needed for processing more complex geometries with secondary hot pressing operations. Subsequent storage of the pre-consolidated feedstocks (e.g., first feedstock piece 14 and second feedstock piece 16) helps to maintain GCMC quality and repeatability compared to existing scenarios of storing unprocessed fiber and glass matrix material for processing into complex geometries to begin with. Also, the process illustrated in process flow 10 involving the use of pre-consolidated sheets (e.g., first feedstock piece 14 and second feedstock piece 16) aids in subsequent complex geometry forming operation assembly via improved fiber placement and fiber orientation control, since the fiber architecture is fixed into the as-processed feedstock pieces (e.g., first feedstock piece 14 and second feedstock piece 16).

The process illustrated in process flow 10 lends itself to better, larger scale manufacturability and commercial viability. For example, utilizing the process illustrated in process flow 10 helps to address significantly high debulking ratios associated with joining a large number of layers, which can be particularly challenging with the formation of small-scale parts without the utilization of the process illustrated in process flow 10.

Pre-consolidated feedstock elements such as first feedstock piece 14, second feedstock piece 16, and consolidated feedstock sheet 22 with prescribed geometries can be used in conjunction with other GCMC elements (e.g., additional un-consolidated fibers and/or glass powder, frit or other formats of granular dry materials) to encourage material flow and joining among all the feedstock layers and materials to form a final GCMC part with complex geometries.

Figure 2:
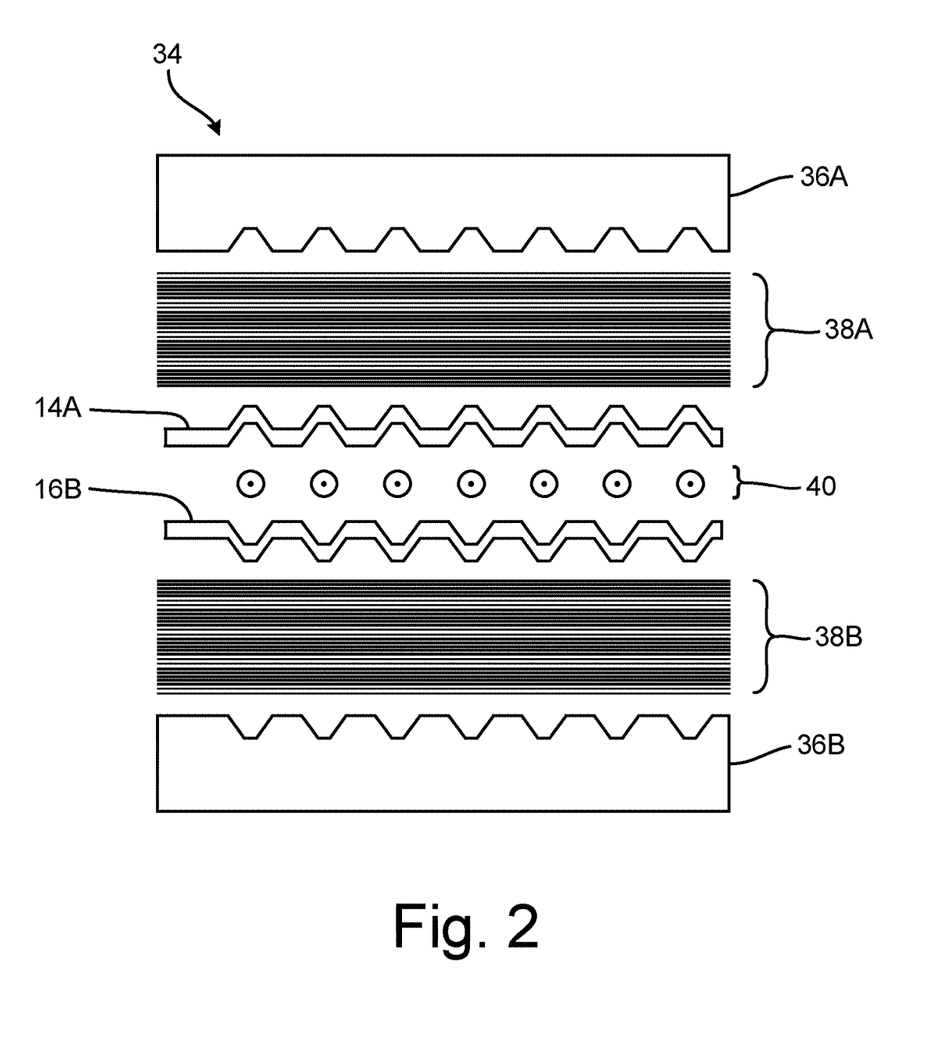
FIG. 2 is a side exploded view of a first feedstock assembly before the feedstock assembly is joined.

FIG. 2 is a side exploded view of first assembly 34 and shows first feedstock piece 14A, second feedstock piece 16B, die tooling 36A and 36B, laminar composites 38A and 38B, and mandrels 40. As shown in FIG. 2, character reference numerals with the letter "A" denote components positioned in the top half of the figure, while character reference numerals including the letter "B" denote components positioned in the bottom half of the figure. Accordingly, the description of the "A" set of components (i.e., 14A, 36A, and 38A) of FIG. 2 will also extend to cover the "B" set of character reference numerals (i.e., 16B, 36B, and 38B). In one example, FIG. 2 depicts die tooling utilized during step 32 shown in FIG. 1.

Die tooling 36A is a die for applying compression in the formation of composite GCMC parts. Laminar composite 38A is a laminated prepressed composite material. In one example, laminar composite 38A can be an unprocessed/unconsolidated tape or tapes. Mandrels 40 are cylindrical or tubular pieces of solid material such as graphite. As shown in FIG. 2, first feedstock piece 14A is positioned between mandrels 40 and laminar composite 38A. Second feedstock piece 16B is positioned between mandrels 40 and laminar composite 38B. Die tooling 36A and die tooling 36B are positioned on the top and bottom, respectively of first assembly 34 (top and bottom as shown in FIG. 2). Laminar composite 38A is positioned between first feedstock sheet 14A and die tooling 36A. Mandrels 40 are disposed between first feedstock sheet 14A and second feedstock sheet 16B. Mandrels are also aligned along a parallel direction with corrugations or imbedded channels of first feedstock sheet 14A and second feedstock 16B.

As shown in FIG. 2, the order of laying of materials above mandrels 40 can be first feedstock sheet 14A, laminar composite 38A, and then die tooling 36A. In another example, first feedstock piece 14A can instead replace laminar composite 38A and the position of feedstock piece 14A can be replaced with one or more unprocessed/unconsolidated tapes (e.g., 'green' tapes). In such an example, a laying order of materials upward from mandrels 40 would be a layer of unprocessed/unconsolidated tapes (in the positioned occupied by first feedstock sheet 14A as shown in FIG. 2), newly positioned first feedstock sheet 14A (in the position occupied by laminar composite 38A as shown in FIG. 2), and then die tooling 36A. This alternate example would also apply to the "B" set of components, in particular those of second feedstock sheet 16B, laminar composite 38A, and die tooling 36B.

In yet another example, a layer of unprocessed/unconsolidated tapes can be added to first assembly 34 in between any of mandrels 40, first feedstock layer 14A, second feedstock layer 16B, laminar composites 38A and 38B, and die tooling 36A and 36B.

In one example, a method of forming a glass-ceramic matrix composite part includes forming a consolidated feedstock material (see e.g., FIG. 1, large feedstock sheet 12) and forming a consolidated glass-ceramic matrix composite complex part (see e.g., FIG. 1, consolidated feedstock sheet 22). Forming large feedstock sheet 12 includes sourcing ceramic fiber and glass matrix materials that are unconsolidated. The unconsolidated ceramic fiber and glass matrix materials can be measured. In this example, measurements of the unconsolidated ceramic fiber and glass matrix materials can include measurements of fiber count (e.g., numeric quantity of fibers), fiber density (e.g., fiber quantity per unit volume), fiber distribution, weight (e.g., kilograms or pounds), size (e.g., centimeters or inches), and volume (e.g., cubic centimeters, liters, or cubic inches). The specifications of the unconsolidated ceramic fiber and glass matrix materials can be determined based on the measurement of the unconsolidated ceramic fiber and glass matrix materials. In this example, the specifications of the unconsolidated ceramic fiber and glass matrix materials can include volume fraction of fibers or other relationships between any of the fiber count, fiber density, fiber distribution, weight, size, and volume measurements. The specifications of the unconsolidated ceramic fiber and glass matrix materials can then be compared with predetermined values. Additionally, the measured unconsolidated fiber and glass matrix can be compared to the pieces/components of the consolidated feedstock material (see e.g., FIG. 1, large feedstock sheet 12).

The unconsolidated ceramic fiber and glass matrix materials are loaded into a first set of tooling. Heat and pressure are then applied by the first set of tooling to the ceramic fiber and glass matrix materials (i.e., the unconsolidated ceramic fiber and glass matrix materials) to form large feedstock sheet 12 (i.e., a consolidated feedstock material). Once formed, large feedstock sheet 12 can be stored or placed into storage until it is retrieved to be used in the formation of a complex consolidated glass-ceramic matrix composite part. In one example, the consolidated feedstock material can be measured. The specifications of the consolidated feedstock material can be determined based on the measurement of the consolidated feedstock material. The specifications of the consolidated feedstock material can then be compared with predetermined values.

Forming the consolidated glass-ceramic matrix composite complex part includes sectioning the consolidated feedstock material (e.g., large feedstock sheet 12, or starting with two or more separate feedstock pieces) to produce a plurality of consolidated feedstock material pieces (e.g., FIG. 1, first feedstock sheet 14/14A and second feedstock sheet 16/16B). First feedstock sheet 14A and second feedstock sheet 16B (i.e., the consolidated feedstock material pieces) are loaded into a second set of tooling (e.g., die tooling 36A and 36B). Heat (e.g., thermal energy) and pressure then are applied to the consolidated feedstock material pieces to form the consolidated glass matrix composite complex part. In one example, the heat and pressure can be applied in a high vacuum environment or in an inert gas environment during pressing. In this example, die tooling applies compression (e.g., pressing) and/or thermal energy to first assembly 34 to for the consolidated glass matrix composite complex part. After this pressing stage, an inert gas can be flowed into first assembly 34 to expedite cooling of the part, die tooling, and hot press chamber. Post-processing and finishing steps can also be applied to the consolidated glass matrix composite complex part to form the final glass-ceramic matrix composite complex part. In one example, post-processing and/or finishing steps can include surface treatments (e.g., coatings, hardening, etc.), grinding, polishing, sanding, trimming, and other similar processes.

With existing processes, building a complex structure by laying up fibers in particular positions and orientations can be challenging. Likewise, managing glass powder so that the glass powder is distributed evenly though all of the complex curvatures and inner-tow/intra-tow spacing of the fibers, (e.g., for heat exchangers with geometries with thin walls or for high-temp bladed vane applications with curvature). Here with the use of first assembly 34 and the process illustrated by process flow 10, the fibers and glass powder are more easily managed by the pre-formed shapes of first feedstock sheet 14, second feedstock sheet 16, and consolidated feedstock sheet 22 with intermediate complexities, which are loaded into the tooling (e.g., die tooling 36A and 38B) to form the final workpiece.

Figure 3:
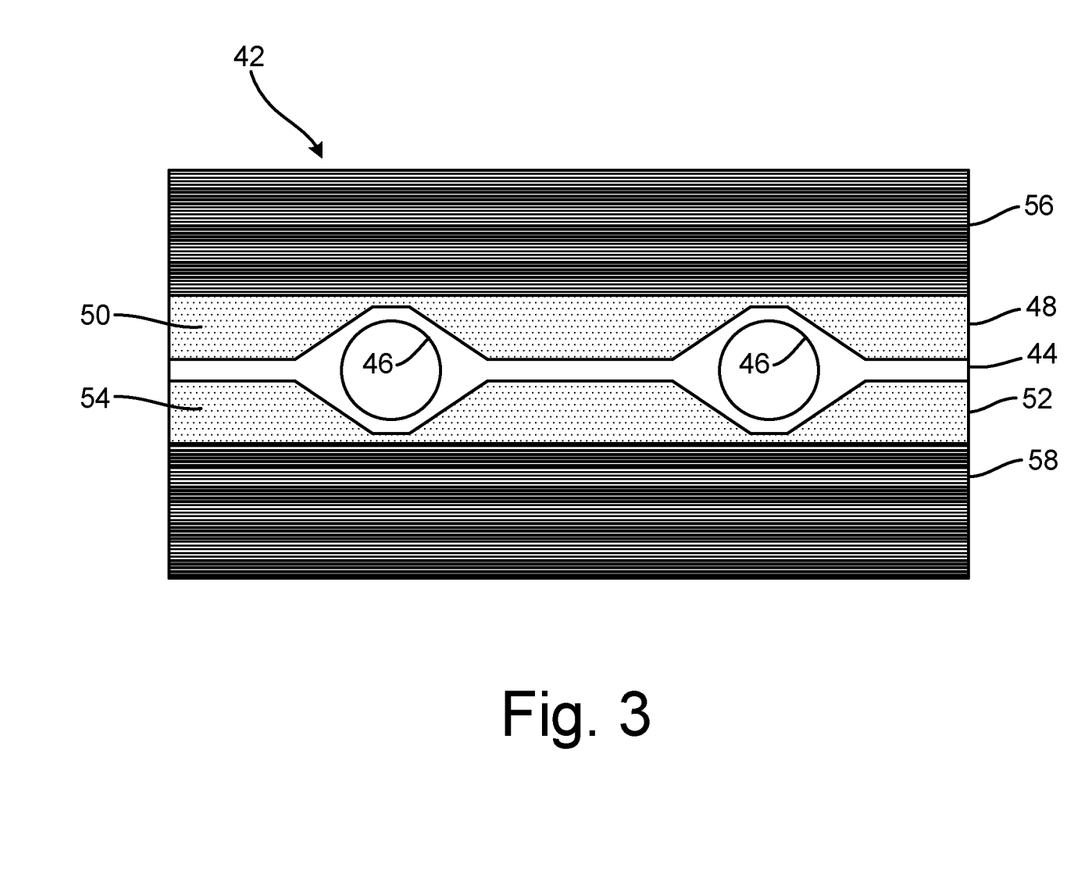
FIG. 3 is a side assembled view of second feedstock assembly after the second assembly is joined.

FIG. 3 is a side assembled view of second assembly 42 and shows consolidated feedstock sheet 44 (with passages 46), first upper preformed block section 48 (with fibers 50), first lower preformed block section 52 (with fibers 54), second upper preformed block section 56, and second lower preformed block section 58.

Second assembly 42 is a composite layup of materials including consolidated feedstock sheet 44, first upper preformed block section 48, first lower preformed block section 52, second upper preformed block section 56, and second lower preformed block section 58. Consolidated feedstock sheet 44 is a preformed sheet of feedstock material. In this example, consolidated feedstock sheet 44 is the consolidated feedstock piece resulting from the pressing of assembly 34 shown in FIG. 2.

Passages 46 are fluid channels or cylindrical openings. In this example, passages 46 are formed by mandrels 40 shown in FIG. 2. First upper preformed block section 48 and first lower preformed block section 52 are preformed block sections of material that include fibers, glass matrix, and/or glass powder that are configured to flow during a joining step. In this example, fibers 50 and fibers 54 can include fibers or other GCMC materials. Second upper preformed block section 56 and second lower preformed block section 58 are preformed block sections of material that include fibers and/or glass powder that are configured to have reduced flowability during a joining step.

Second assembly 42 is shown in an assembled and formed state. Consolidated feedstock sheet 44 is disposed between first upper preformed block section 48 and first lower preformed block section 52. Passages 46 are formed in and disposed through consolidated feedstock sheet 44. First upper preformed block section 48 is disposed between and in contact with consolidated feedstock sheet 44 and second upper preformed block section 56. Fibers 50 are disposed within and throughout first upper preformed block section 48. First lower preformed block section 52 is disposed between and in contact with consolidated feedstock sheet 44 and second lower preformed block section 58. Fibers 54 are disposed within and throughout first lower preformed block section 52. Second upper preformed block section 56 is disposed as a top layer of second assembly 42. Second lower preformed block section 58 is disposed as a bottom layer of second assembly 42.

Here, fibers 50 and 54 are shown as having an evenly spaced distribution pattern throughout first upper preformed block section 48 and first lower preformed block section, respectively. During the pressing stages of the forming process, the corrugated shape of consolidated feedstock sheet 44 allows fibers 50 and 54 to self-assemble and remain in general alignment as all of the different layers are pressed together. In contrast, if an un-shaped non-consolidated feedstock sheet were used, and then the assembly were pressed to change the overall shape, the fibers and glass matrix would flow, drift, and become too far out of alignment in order to meet material consistency thresholds (e.g., fiber volume faction) needed for the finally formed complex shaped GCMC workpiece.

In this example, fibers 50 and 54 of assembly 42 are oriented such that material flow around passages 46 is encouraged. Such material flow during processing creates joining of pre-consolidated GCMC layer(s) (e.g., consolidated feedstock sheet 44), un-consolidated GCMC layers (e.g., first upper and lower preformed block sections 48 and 52 and second upper and lower preformed block sections 56 and 58), and embedded mandrels 40 (represented by passages 46 in FIG. 3) to form a complex geometry GCMC part (e.g., the workpiece that is formed by second assembly 42). Also, the fiber and glass matrix GCMC material that is added for process flow is free to fill in unconsolidated regions and improves local and global material properties by reducing the areas without fiber reinforcement and matrix porosity.

The processes and assemblies discussed herein provide repeatable quality GCMC for complex geometry parts, by providing a method to lock fiber orientation, matrix density, and fiber/matrix distributions by starting from consistent quality feedstock to assemble more complex geometries. Such processes and assemblies also reduce the risks associated with complex geometry fiber preform lay-up and reduce the possibilities of significant fiber misalignments, loss of fiber during assembly, matrix maldistribution, and loss of matrix during assembly. The processes and assemblies of the disclosure provide for easier joining of unconsolidated and/or pre-consolidated GCMC parts. The processes and assemblies of the disclosure also allow for easier GCMC laminate mixing and matching with different fiber orientations. The processes and assemblies of the disclosure provide opportunities for improved GCMC assembly design space and realizable cost reductions.

Discussion of Possible Embodiments

A method of forming a part includes forming a glass-ceramic matrix composite material to form a pre-consolidated feedstock sheet with a pre-determined shape. The pre-consolidated feedstock sheet is sectioned into a first piece of pre-consolidated feedstock sheet and a second piece of pre-consolidated feedstock sheet. The first piece of pre-consolidated feedstock sheet and a second piece of pre-consolidated feedstock sheet are assembled with a second piece of pre-consolidated feedstock sheet to form a composite layup. The first piece of pre-consolidated feedstock sheet and the second piece of pre-consolidated feedstock sheet are joined by compressing the composite layup to form a glass-ceramic matrix composite part.

The method of the preceding paragraph can optionally include, additionally and/or alternatively, any one or more of the following steps, features, configurations, and/or additional components.

One of the plurality of pieces of pre-consolidated feedstock sheet can be assembled with at least one of a tape and a mandrel.

The pre-determined shape of the pre-consolidated feedstock sheet can include embedded channels.

Forming the glass-ceramic matrix composite material can comprise at least one of heating, inert gas hot pressing, and/or vacuum hot pressing the glass-ceramic matrix composite material.

The pre-consolidated feedstock sheet comprises ceramic fibers, and the method further comprising maintaining an orientation of the ceramic fibers during the steps of assembling and joining.

A header block can be formed by pushing a ceramic fiber fabric with glass matrix down over a plurality of ceramic fiber and glass matrix wound tubes; and/or the header block can be formed to the glass matrix composite part to form a headered tube sheet heat exchanger.

Joining of feedstock header blocks to tube sheet can comprise consolidating the header block with the glass matrix composite part.

Joining the header block to the glass matrix composite part can comprise ceraming the header block and/or the glass matrix composite part to transform the glass matrix into a glass-ceramic matrix.

The header block can be connected to and/or in fluid communication with the glass matrix composite part.

A method of forming a glass-ceramic matrix composite part includes forming a consolidated feedstock material and forming a consolidated glass-ceramic matrix composite complex part. Forming a consolidated feedstock material includes sourcing a ceramic fiber and a glass matrix material that are unconsolidated. The unconsolidated ceramic fiber and glass matrix materials are loaded into a first tooling. Heat and pressure are applied to the unconsolidated ceramic fiber and glass matrix materials to form a consolidated feedstock material. Forming the consolidated glass-ceramic matrix composite complex part includes sectioning the consolidated feedstock material to produce a plurality of consolidated feedstock material pieces. The plurality of consolidated feedstock material pieces is assembled into a composite layup. Heat and pressure are then applied to the composite layup to fuse the consolidated feedstock material pieces and form the consolidated glass-ceramic matrix composite complex part.

The method of the preceding paragraph can optionally include, additionally and/or alternatively, any one or more of the following steps, features, configurations, and/or additional components.

Unconsolidated ceramic fiber and/or glass matrix materials can be measured, specifications of the unconsolidated ceramic fiber and/or glass matrix materials can be determined based on the measurement of the unconsolidated ceramic fiber and glass matrix materials, and/or the specifications of the unconsolidated ceramic fiber and glass matrix materials can be compared with predetermined values.

Specifications of the unconsolidated ceramic fiber and glass matrix materials can comprise volume fraction of fibers, fiber count, fiber density, fiber distribution, weight, size, and volume of the unconsolidated ceramic fiber and glass matrix materials.

Consolidated feedstock material can be measured, specifications of the consolidated feedstock material can be determined based on the measurement of the consolidated feedstock material, and/or the specifications of the consolidated feedstock material can be compared with predetermined values.

Specifications of the consolidated feedstock material can comprise volume fraction of fibers, fiber count, fiber density, fiber distribution, weight, size, and volume of the consolidated feedstock material.

A finishing operation can be applied to the consolidated glass matrix composite complex part to form the consolidated glass-ceramic matrix composite complex part.

The finishing operation can comprise at least one of surface treatments, grinding, polishing, sanding, and trimming.

A portion of the consolidated feedstock material can be machined to produce a shaped consolidated feedstock material piece.

A shape of the shaped consolidated feedstock material piece can comprise at least one of a holed, a bumped, a corrugated, and a curved shape.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of forming a part, the method comprising:
   forming a glass-ceramic matrix composite material into a pre-consolidated feedstock sheet with a corrugated shape, wherein forming the pre-consolidated feedstock material comprises:
      loading unconsolidated ceramic fibers and glass matrix materials into a first tooling, wherein the ceramic fibers are arranged in a unidirectional fiber tape, woven fabric, or combination thereof; and
      applying heat and pressure to the unconsolidated ceramic fiber and glass matrix materials to form the pre-consolidated feedstock sheet with corrugations;
   sectioning the pre-consolidated feedstock sheet into a first piece of pre-consolidated feedstock sheet and a second piece of pre-consolidated feedstock sheet wherein each of the first and second pieces of pre-consolidated feedstock sheet have corrugations;
   assembling the first piece of pre-consolidated feedstock sheet and the second piece of pre-consolidated feedstock sheet with an unconsolidated reinforcing material comprising one or more unconsolidated layers of unidirectional fiber tape or woven material with glass powders to form a composite layup wherein the first and second pieces of pre-consolidated feedstock sheet and unconsolidated reinforcing material are disposed in a die tooling with a plurality of mandrels disposed between the first and second pieces of pre-consolidated feedstock sheet, the plurality of mandrels aligned in a parallel direction with the corrugations of the first and second pieces of pre-consolidated feedstock sheet;
   joining the first piece of pre-consolidated feedstock sheet and the second piece of pre-consolidated feedstock sheet by heating and compressing the composite layup to form a glass-ceramic matrix composite part with embedded channels; and
   maintaining an orientation of the ceramic fibers of each of the first and second pieces of pre-consolidated feedstock sheet during the steps of assembling and joining.

2. The method of claim 1, wherein forming the glass-ceramic matrix composite material comprises at least one of the steps of inert gas hot pressing the glass-ceramic matrix composite material and vacuum hot pressing the glass-ceramic matrix composite material.

3. The method of claim 1, further comprising:
   forming a header block by pushing a ceramic fiber fabric with glass matrix down over a plurality of ceramic fiber and glass matrix wound tubes; and
   joining the header block to the glass-ceramic matrix composite part to form a headered tube sheet heat exchanger.

4. The method of claim 3, wherein joining the header block to the glass-ceramic matrix composite part comprises consolidating the header block with the glass-ceramic matrix composite part.

5. The method of claim 3, wherein joining the header block to the glass-ceramic matrix composite part comprises ceraming the header block and the glass-ceramic matrix composite part to transform the glass matrix into a glass-ceramic matrix.

6. The method of claim 3, wherein the header block is connected to and in fluid communication with the glass-ceramic matrix composite part.

7. A method of forming a glass-ceramic matrix composite part, the method comprising:
forming a consolidated feedstock material in a predetermined shape, wherein forming the consolidated feedstock material comprises:
sourcing a ceramic fiber and a glass matrix material that are unconsolidated and include ceramic fibers arranged in a unidirectional fiber tape, woven fabric, or combination thereof;
loading the unconsolidated ceramic fiber and glass matrix materials into a first tooling; and
applying heat and pressure to the unconsolidated ceramic fiber and glass matrix materials to form a consolidated feedstock material with corrugations; and
forming a consolidated glass-ceramic matrix composite part, wherein forming the consolidated glass-ceramic matrix composite part comprises:
sectioning the consolidated feedstock material to produce a plurality of consolidated feedstock material pieces wherein the plurality of consolidated feedstock material pieces has corrugations;
assembling the plurality of consolidated feedstock material pieces and a first unconsolidated reinforcing material into a composite layup, the first unconsolidated reinforcing material comprising one or more unconsolidated layers of unidirectional fiber tape or woven material with glass powders, and wherein the plurality of consolidated feedstock material pieces and first unconsolidated reinforcing material are disposed in a die tooling with a plurality of mandrels disposed between the plurality of consolidated feedstock material pieces, the plurality of mandrels aligned in a parallel direction with the corrugations of the plurality of consolidated feedstock material pieces; and
applying heat and pressure to the composite layup to fuse the consolidated feedstock material pieces and the first unconsolidated reinforcing material and form the consolidated glass-ceramic matrix composite part with embedded channels, wherein the orientation of the ceramic fibers of the consolidated feedstock material pieces is maintained during the steps of assembling and applying heat and pressure.

8. The method of claim 7, further comprising:
measuring, prior to forming the consolidated feedstock, the unconsolidated ceramic fiber and glass matrix materials;
determining specifications of the unconsolidated ceramic fiber and glass matrix materials based on the measurement of the unconsolidated ceramic fiber and glass matrix materials; and
comparing the specifications of the unconsolidated ceramic fiber and glass matrix materials with predetermined values; wherein the specifications of the unconsolidated ceramic fiber and glass matrix materials comprise volume fraction of fibers, fiber count, fiber density, fiber distribution, weight, size, and volume of the unconsolidated ceramic fiber and glass matrix materials.

9. The method of claim 7, further comprising:
measuring the consolidated feedstock material;
determining specifications of the consolidated feedstock material based on the measurement of the consolidated feedstock material; and
comparing the specifications of the consolidated feedstock material with predetermined values, wherein the specifications of the consolidated feedstock material comprise volume fraction of fibers, fiber count, fiber density, fiber distribution, weight, size, and volume of the consolidated feedstock material.

10. The method of claim 7, further comprising applying a finishing operation to the consolidated glass-ceramic matrix composite part to form the consolidated glass-ceramic matrix composite part.

11. The method of claim 10, wherein the finishing operation comprises at least one of surface treatments, grinding, polishing, sanding, and trimming.

12. The method of claim 7, wherein sectioning the consolidated feedstock material comprises machining a portion of the consolidated feedstock material.

13. The method of claim 7, wherein forming the consolidated glass-ceramic matrix composite part further comprises:
assembling a second unconsolidated reinforcing material with the plurality of consolidated feedstock material pieces and the first unconsolidated reinforcing material; and
applying heat and pressure to the composite layup to fuse the consolidated feedstock material pieces and the first and second unconsolidated reinforcing materials and form the consolidated glass-ceramic matrix composite part with embedded channels.

14. The method of claim 13, wherein the first and second unconsolidated reinforcing materials comprise one or more unconsolidated layers of a unidirectional fiber tape or woven material with glass powders.

15. The method of claim 7, further comprising assembling a first upper preform block and a first lower preform block with the consolidated glass-ceramic matrix composite part wherein the first upper preform block and the first lower preform block are disposed around the consolidated glass-ceramic part and include fibers, glass matrix, and/or glass powder.

16. The method of claim 15, further comprising assembling a second upper preform block and a second lower preform block with the consolidated glass-ceramic matrix composite part wherein the second upper preform block and the second lower preform block are disposed around the consolidated glass-ceramic matrix composite part and include fibers and/or glass powder.

* * * * *